(12) United States Patent
Kunkel et al.

(10) Patent No.: US 9,560,137 B1
(45) Date of Patent: *Jan. 31, 2017

(54) OPTIMIZING REMOTE DIRECT MEMORY ACCESS (RDMA) WITH CACHE ALIGNED OPERATIONS (71) Applicant: International Business Machines Corporation, Armonk, NY (US)

(72) Inventors: Randall T. Kunkel, Apex, NC (US); Donald W. Schmidt, Stone Ridge, NY (US); Jerry W. Stevens, Releigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,412

(22) Filed: Aug. 25, 2016

Related U.S. Application Data

(63) Continuation of application No. 15/062,728, filed on Mar. 7, 2016, now Pat. No. 9,451,027, which is a continuation of application No. 14/867,395, filed on Sep. 28, 2015.

(51) Int. Cl.
*G06F 15/16* (2006.01)
*H04L 29/08* (2006.01)
(52) U.S. Cl.
CPC ....... *H04L 67/1097* (2013.01); *H04L 67/2842* (2013.01)
(58) Field of Classification Search
CPC .......................... H04L 29/06; H04L 29/08072
USPC ............................... 709/203, 220, 224, 227
See application file for complete search history.

(56) References Cited

U.S. PATENT DOCUMENTS

| | | | | |
|---|---|---|---|---|
| 7,430,615 | B2* | 9/2008 | Blackmore | ......... H04L 67/1097 709/214 |
| 7,480,298 | B2* | 1/2009 | Blackmore | ......... G06F 12/1081 370/392 |
| 7,581,015 | B2 | 8/2009 | Nakashima et al. | |
| 2006/0047771 | A1* | 3/2006 | Blackmore | ......... H04L 67/1097 709/209 |
| 2006/0059242 | A1* | 3/2006 | Blackmore | ......... G06F 12/1081 709/211 |

(Continued)

OTHER PUBLICATIONS

List of IBM Patents or Patent Applications Treated as Related; (Appendix P), 2 pages.

(Continued)

*Primary Examiner* — Khanh Dinh
(74) *Attorney, Agent, or Firm* — Cantor Colburn LLP; Richard Wilhelm (57) ABSTRACT

A system for optimizing remote direct memory accesses (RDMA) is provided. The system includes a first computing device and a second computing device disposed in signal communication with the first computing device. The first and second computing devices are respectively configured to exchange RDMA credentials during a setup of a communication link between the first and second computing devices. The exchanged RDMA credentials include cache line size information of the first computing device by which a cache aligned RDMA write operation is executable on a cache of the first computing device in accordance with the cache line size information by the second computing device.

1 Claim, 6 Drawing Sheets (56) References Cited

U.S. PATENT DOCUMENTS

2015/0326684 A1    11/2015    Takefman et al.

OTHER PUBLICATIONS

Randall T. Kunkel, "Optimizing Remote Direct Memory Access (RDMA) With Cache Aligned Operations", U.S. Appl. No. 14/867,395, filed Sep. 28, 2015.
Randall T. Kunkel, "Optimizing Remote Direct Memory Access (RDMA) With Cache Aligned Operations", U.S. Pat. No. 9,451,027 issued Sep. 20, 2016.

* cited by examiner

OPTIMIZING REMOTE DIRECT MEMORY ACCESS (RDMA) WITH CACHE ALIGNED OPERATIONS

CROSS-REFERENCE TO RELATED APPLICATION

This application is a continuation of and claims the benefit of priority to U.S. application Ser. No. 14/867,395, which was filed on Sep. 28, 2015, and to U.S. application Ser. No. 15/062,728, which was filed on Mar. 7, 2016. The entire contents of U.S. application Ser. No. 14/867,395 and U.S. application Ser. No. 15/062,728 are incorporated herein by reference.

BACKGROUND

The present invention relates to remote direct memory access (RDMA) and, more specifically, optimization of RDMA with cache aligned operations.

In computing, RDMA relates to direct memory access operations from the real local memory of one computer into the real local memory of another computer without the need to involve certain components of either computer's operating system. This permits high-throughput, low-latency networking, which is especially useful in massively parallel computer clusters. Applications of RDMA support zero-copy networking by enabling local network adapters to transfer data directly to or from application memory, thereby eliminating a need to copy data between application memory and data buffers in the operating system. Such transfers require no work to be done by central processing units (CPUs), caches or context switches, and allow for transfers to continue in parallel with other system operations. That is, when an application performs an RDMA read or write operation, the relevant application data is delivered directly to the peer's physical memory via the network to reduce latency and enable fast message or data transfer.

RDMA technology broadly supports write, read and autonomous updates of computer system memory and there are many communication protocols that allow application programming interfaces (APIs) to enable exploitation of RDMA based technology over various communications media, such as Infiniband, Ethernet and long distant networks (WAN). However, when RDMA based technology is to be exploited, there are numerous performance considerations relating to remote memory access processes that should be addressed.

One such consideration is that RDMA operations (e.g., RDMA-write accesses) should if possible be handled on a processor cache line basis and applies to both the local and the remote hosts. That is, when data is written to a remote peer's memory, it may be beneficial to perform write operations on a cache line boundary and on a full cache line basis (vs. non-aligned or partial write operations when possible) since the penalty for not aligning the write operations can result in moderate to severe latency with respect to the local host computer's DMA operations to the local host memory sub-system. Indeed, an unaligned large write operation can result in hundreds of unaligned DMA write operations (depending on total transfer and packet size) with the eventual amount of latency varying based on the remote peer's platform hardware and memory sub-system (i.e., the remote peer's adapter card, PCIe bus, memory sub-system architecture, etc.).

The injected latency in DMA operations can cause local congestion that results in overall network latency and even packet loss that in turn results in retransmission, pause frames and other congestion control actions that lead to poor overall performance.

SUMMARY

According to an embodiment of the present invention, a computer-implemented method for optimizing remote direct memory accesses (RDMA) is provided. The method includes exchanging RDMA credentials between first and second computing devices during a setup of a communication link between the first and second computing devices, wherein the exchanging includes issuing a link request by the second computing device to the first computing device and issuing a link response by the first computing device to the second computing device in response to the link request, the link response including one of a first indication that an align RDMA write option (ARW) is unsupported by the first computing device and a second indication that the ARW is supported by the first computing device for a predefined cache size, including, within the exchanged RDMA credentials, cache line size information of the first computing device, saving the exchanged RDMA credentials, including the cache line size information of the first computing device, in a persisting state, executing, in accordance with the cache line size information, a cache aligned RDMA write operation by the second computing device on a cache of the first computing device, wherein the cache aligned RDMA write operation includes at least one of an addition of a trailing pad to RDMA write operation data by the second computing device, a definition of an RDMA write operation start address resulting from a rounding up of a target start address by the second computing device, a transmission of a first portion of RDMA write operation data and a second portion of the RDMA write operation data with metadata in a single RDMA write operation by the second computing device and a transmission of a first portion of RDMA write operation data in a first RDMA write operation by the second computing device and a transmission of a second portion of the RDMA write operation data with existing metadata in a second RDMA write operation by the second computing device and generating a data availability notification by the second computing device for the first computing device upon completion of the cache aligned RDMA write operation.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

There are several problems that prevent a host transport protocol from reliably handling RDMA operations (e.g., RDMA-write accesses) on a processor cache line basis and thereby optimizing RDMA-read/write operations. These include, but are not limited to the unpredictable nature of upper layer application (user) data patterns, size, boundary alignment and other characteristics owing to application data requirements that can vary significantly and cannot be restricted and the possibility that the transmitting host is unaware of the cache line size of the remote peer host. Thus and, as will be described below, a computer program product and a computer-implemented method of optimizing RDMA with cache aligned operations is provided to allow for a communication or exchange of platform cache line size information between peers.

That is, while previous implementations of RDMA based technology can assume cache line size in what is at best a functional but not optimal manner and transport protocols can impose restrictions on target memory alignment rules and usage patterns which limits application data patterns, creates additional memory exchange signaling overhead or imposes additional API and memory architecture restrictions, the optimized RDMA described herein does not rely on merely functional assumptions of cache line size and imposes no restrictions on target memory alignment rules and usage patterns.

Figure 1:
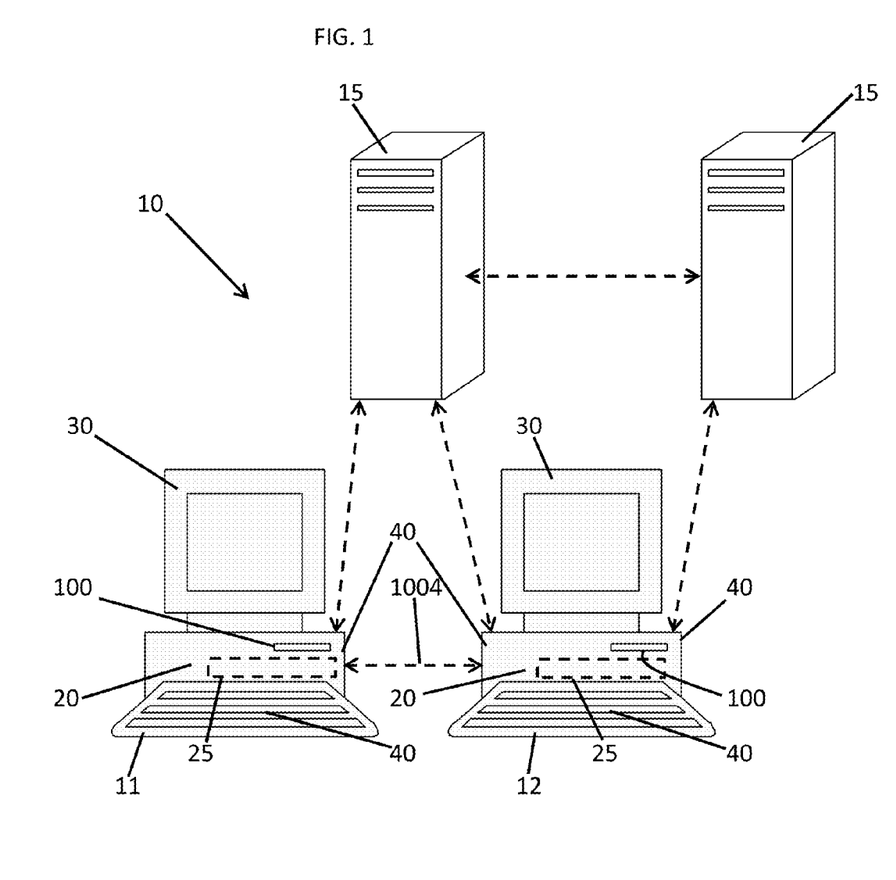
FIG. 1 is a schematic diagram of a computing system in accordance with embodiments.

With reference to FIG. 1, a computing system 10 is provided and may be configured for example as an enterprise computing system or as a personal computing system. In either case, the computing system 10 includes at least first computing device 11 and second computing device 12, which are configured to be networked together for communication purposes and thus are disposable in signal communication with each other. It will be understood, of course, that additional computing devices could be provided in the computing system 10 but these are not described herein for purposes of clarity and brevity.

Each of the first and second computing devices 11 and 12 includes among other features a processing circuit 20, a memory unit 25, a display 30, user input devices 40 and a networking unit 50 as well as a computer program product 100 for optimizing RDMA. The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit 50 may be provided as an Ethernet or other suitable networking device by which the first and second computing devices 11 and 12 are communicative with each other.

Figure 2:
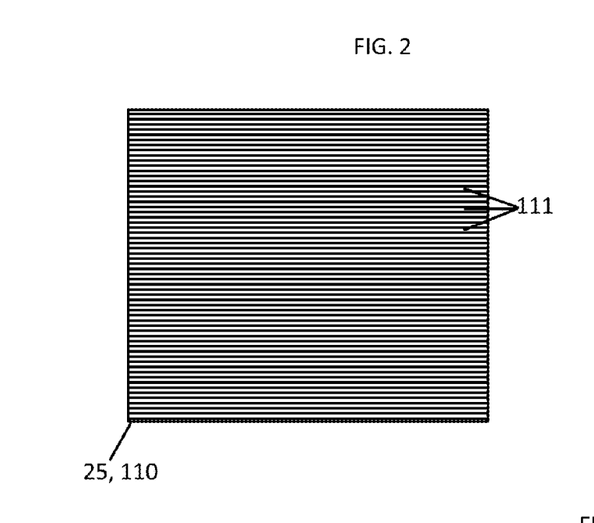
FIG. 2 is a schematic diagram of a portion of a memory unit of a first computing device of the computing system of FIG. 1.
Figure 3:
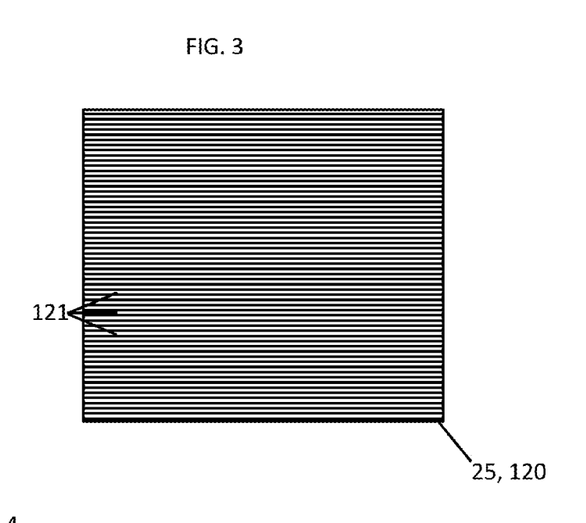
FIG. 3 is a schematic diagram of a portion of a memory unit of a second computing device of the computing system of FIG. 1.

With reference to FIGS. 2 and 3, respective portions of the memory units 25 of the first and second computing devices 11 and 12 will now be described. As shown in FIG. 2, the portion of the memory unit 25 of the first computing device 11 may include various types of random-access and read-only memory and may be provided with a first cache 110. This first cache 110 may be configured with multiple cache lines 111 that each have multiple address locations defined at sequential points along their respective lengths. The respective sizes of the multiple cache lines 111 may be varied or unique with respect to cache line sizes of other caches and may be provided, for example, as 64 byte cache lines, 128 byte cache lines or 256 byte cache lines. Similarly, as shown in FIG. 3, the portion of the memory unit 25 of the second computing device 12 may include various types of random-access and read-only memory and may be provided with a second cache 120. This second cache 120 may be configured with multiple cache lines 121 that each have multiple address locations defined at sequential points along their respective lengths. The respective sizes of the multiple cache lines 121 may be varied or unique with respect to cache line sizes of other caches and may be provided, for example, as 64 byte cache lines, 128 byte cache lines or 256 byte cache lines.

It is to be understood that the first cache 110 and the second cache 120 are both separate from the respective main memories of the first and second computing devices 11 and 12 and both may have unique cache line sizes in accordance with various factors including, but not limited to, processor architecture.

In an exemplary case in which the second computing device 12 executes a non-optimized RDMA write operation on the first cache 110 of the first computing device 11, the non-optimized RDMA write operation effectively becomes a DMA read operation by the second computing device 12 followed by DMA write operation at the first cache 110. Thus, when the second computing device 12 initiates the non-optimized RDMA write operation on the first cache 110, the first RDMA write operation begins at a first byte offset for the length of data to be transmitted and the next write operation starts directly after the last (previous) byte is written or at a byte offset following the last byte of the previous RDMA write operation. In other words, if the first RDMA write operation on the first cache 110 was for a length of 4500 (×1194) bytes, the (first) or next RDMA write operation will start at a remote buffer area+4 (+4 to account for the 4 byte control header of the remote buffer area) and will end at 4504 (×1198) and a subsequent RDMA write operation will start at the next available byte at byte offset+ 4505 (×1199) and so on.

For each of the RDMA write operations, a full line store refers to those incidents where RDMA write operations start at beginnings of cache lines and have lengths that correspond to the sizes of those cache lines. Conversely, partial store operations occur when byte offsets are not cache aligned or where RDMA write operations have less data than a full cache line. Such partial stores can be non-optimal and may lead to latency related to direction of data flows, workload patterns, PCIe configuration Node/PBU, the incidence (frequency) of concurrent partial stores, etc.

However, if the second computing device 12 aligns RDMA-write operations to begin on cache line boundaries, the numbers of partial store operations at the first cache 110 could be significantly reduced as compared to cases in which an initial operation is not aligned and the associated penalty occurs for every subsequent packet. Indeed, a 32 k non-optimized RDMA-write operation executed by the second computing device 12 may generate 32 packets (e.g., with a 1 k maximum transmission unit (MTU) or a similar value) at some offset into the first cache 110 where each packet will normally cause 2 partial store operations (non-aligned) along with 2 line store operations (aligned stores) when the target system has a 256 byte cache line size for a total of 64 partial stores along with approximately 64 line stores in a non-optimized case. Conversely, an optimized RDMA write operation would begin on a cache line 111 rounding up to the next cache aligned offset. After all full cache lines are written, the remaining non-aligned data is written resulting in minimal partial stores. This approach reduces the partial stores to 2 (1 at the beginning and 1 at the end of the entire optimized RDMA write operation) yielding in a 64 to 2 partial store reduction in the exemplary case. This approach represents a potential for significant savings with the larger the payload (i.e., the optimized RDMA write operation), the larger the opportunity for savings.

Figure 4:
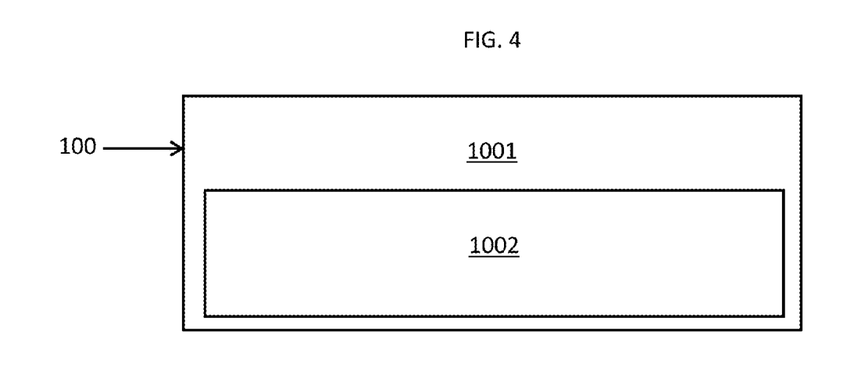
FIG. 4 is a schematic diagram of a computer program product of the computing system of FIG. 1 in accordance with embodiments.
Figure 5:
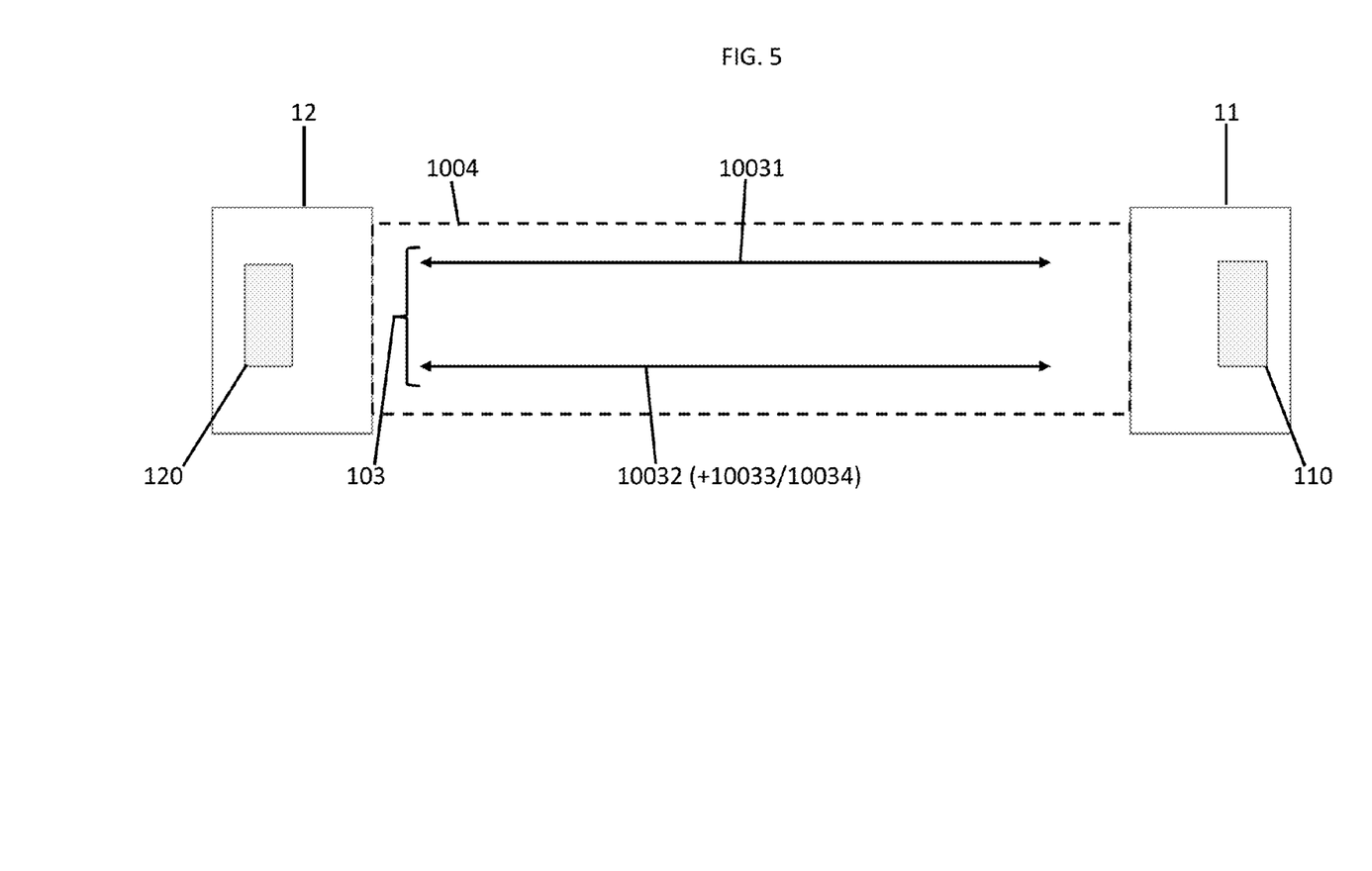
FIG. 5 is a schematic illustration of an exchange of RDMA credentials of the computer program product of FIG. 4 when deployed in the computing system of FIG. 1.
Figure 6:
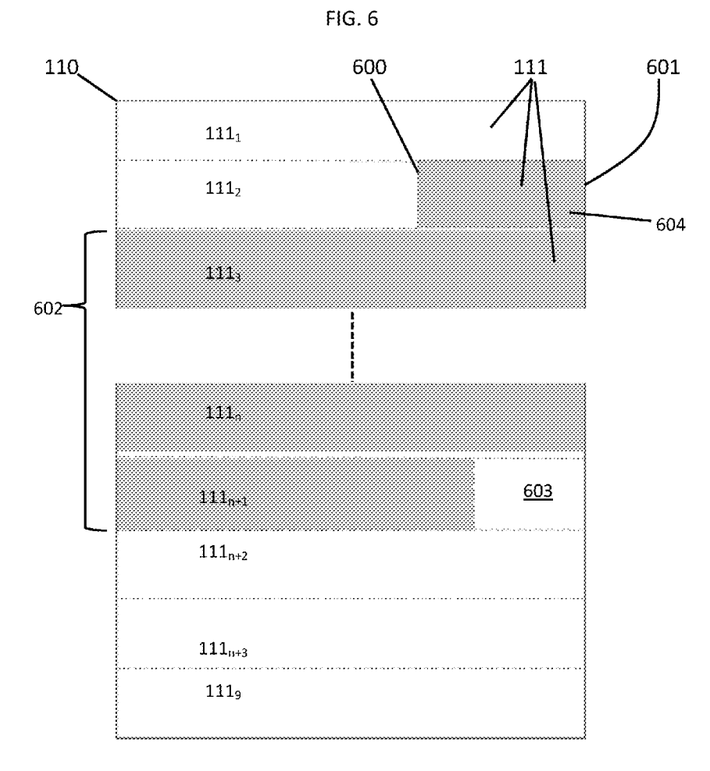
FIG. 6 is a schematic illustration of data superimposed over physical memory that is shown as being sectioned into individual cache lines where the data does not begin or end on a cache line boundary (unaligned)

Thus, with reference to FIGS. 4-6, the computer program product 100 includes a computer readable storage medium 1001 having program instructions 1002 stored thereon. The program instructions 1002 are executable by the respective processing circuits 20 of each of the first and second computing devices 11 and 12 to cause the respective processing circuits 20 to exchange RDMA credentials 1003 during a setup of a communication link 1004 (see FIG. 1) between the first and second computing devices 11 and 12. In accordance with embodiments, the exchanged RDMA credentials 1003 may include, for example, cache line size information of the first cache 110 of the first computing device 11. Using this cache line size information and in accordance therewith, a cache aligned RDMA write operation is executable on the first cache 110 by the second computing device 12.

As shown in FIG. 5, the program instructions 1002 are executable by the processing circuit 20 of the second computing device 12 to configure the second computing device 12 to issue a link request 10031 to the first computing device 11 along the communication link 1004. Meanwhile, the program instructions 1002 are executable by the processing circuit 20 of the first computing device 11 to configure the first computing device 11 to issue a link response 10032 to the second computing device 12 in response to the link request 10031. This link response 10032 may include one of a first indication 10033 and a second indication 10034.

The first indication 10033 may be provided as a "0000" bit and indicates to the second computing device 12 that an align RDMA write option (ARW) is unsupported by the first computing device 11. The second indication 10034 indicates to the second computing device 12 that the ARW is supported by the first computing device 11 for predefined cache sizes. That is, if the cache lines 111 of the first cache 110 have 64 byte cache line sizes, the second indication 10034 may be in the form of a "0001" bit, if the cache lines 111 of the first cache 110 have 128 byte cache line sizes, the second indication 10034 may be in the form of a "0010" bit and if the cache lines 111 of the first cache 110 have 256 byte cache line sizes, the second indication 10034 may be in the form of a "0011" bit.

It is to be understood that the link request 10031 and the link response 10032 may both be sent by both of the first and second computing devices 11 and 12 and need not be one-way communications.

Where the first indication 10033 is received by the second computing device 12 or where no link response at all is issued, RDMA alignment need not commence. However, where the second indication 10034 is received, the second computing device 12 proceeds with preparation of an optimized RDMA write operation by adjusting the original RDMA write operation to correspond to the size requirements of the cache lines 111 of the first cache 110 of the first computing device 11. Such adjustment, as shown in FIG. 6, may initially include recognizing, by the second computing device 12, from the save cache line value that was originally received in the second indication 10034 of the sizes of the cache lines 111 and determining, by the second computing device 12 of an end point of previously stored data. Thus, for a case where the cache lines 111 have 256 byte cache line sizes, the second computing device 12 will determine at an initiation of the optimized RDMA write operation that the end point of previously stored data on the first cache 110 is located at first data end point (offset) 600 defined at about ⅔ of the length of the second cache line $111_2$.

At a next stage of the optimized RDMA operation, the second computing device will effectively split the optimized RDMA write operation into two operations by calculating the remaining length of the second cache line $111_2$ from a rounding up from the first data end point 600 to the next cache line boundary 601. The second computing device 12 will then skip an equivalent length of the unaligned data and transmit the remaining portion of the RDMA write operation data 602 with a single aligned RMDA write operation (e.g., the third cache line $111_3$ to the nth cache line $111_n$). This will cause the corresponding adapter to build and send the corresponding packets (based on the network transmission size specifications such as MTU). Once the first portion of the RDMA write operation data 602 is sent and stored in cache line $111_{n+1}$, a data pad 603 that can be overwritten later is added to the cache line $111_{n+1}$ in case the cache line $111_{n+1}$ is only partially filled. At this point, the second computing device 12 sends a last packet of a second portion of the unaligned RDMA write operation data 604, which includes the data that was originally skipped. As such, even where n is a large number, only 2 partial stores are generated by the optimized RDMA write operation.

In accordance with embodiments, once the last byte of the second portion of the RDMA write operation data 604 is complete, metadata may now be transmitted or appended with information that will describe all of the data that was transferred (e.g., as a data availability notification in the form of a separate signal packet).

While it is understood that the program instructions 1002 may be deployed by manual loading thereof directly into a client, server and/or proxy computer by way of a loadable storage medium, such as a CD, DVD, etc., being manually inserted into each of the first and second computing devices 11 and 12, the program instructions 1002 may also be automatically or semi-automatically deployed into the computing system 10 by way of a central server 15 or a group of central servers 15 (see FIG. 1). In such cases, the program instructions 1002 may be downloadable into client computers that will then execute the program instructions 1002.

In accordance with alternative embodiments, the program instructions 1002 may be sent directly to a client system via e-mail with the program instructions 1002 then being detached to or loaded into a directory. Another alternative would be that the program instructions 1002 be sent directly to a directory on a client computer hard drive. When there are proxy servers, however, loading processes will select proxy server codes, determine on which computers to place the proxy servers' codes, transmit the proxy server codes and then install the proxy server codes on proxy computers.

The program instructions 1002 will then be transmitted to the proxy server and subsequently stored thereon.

Figure 7:
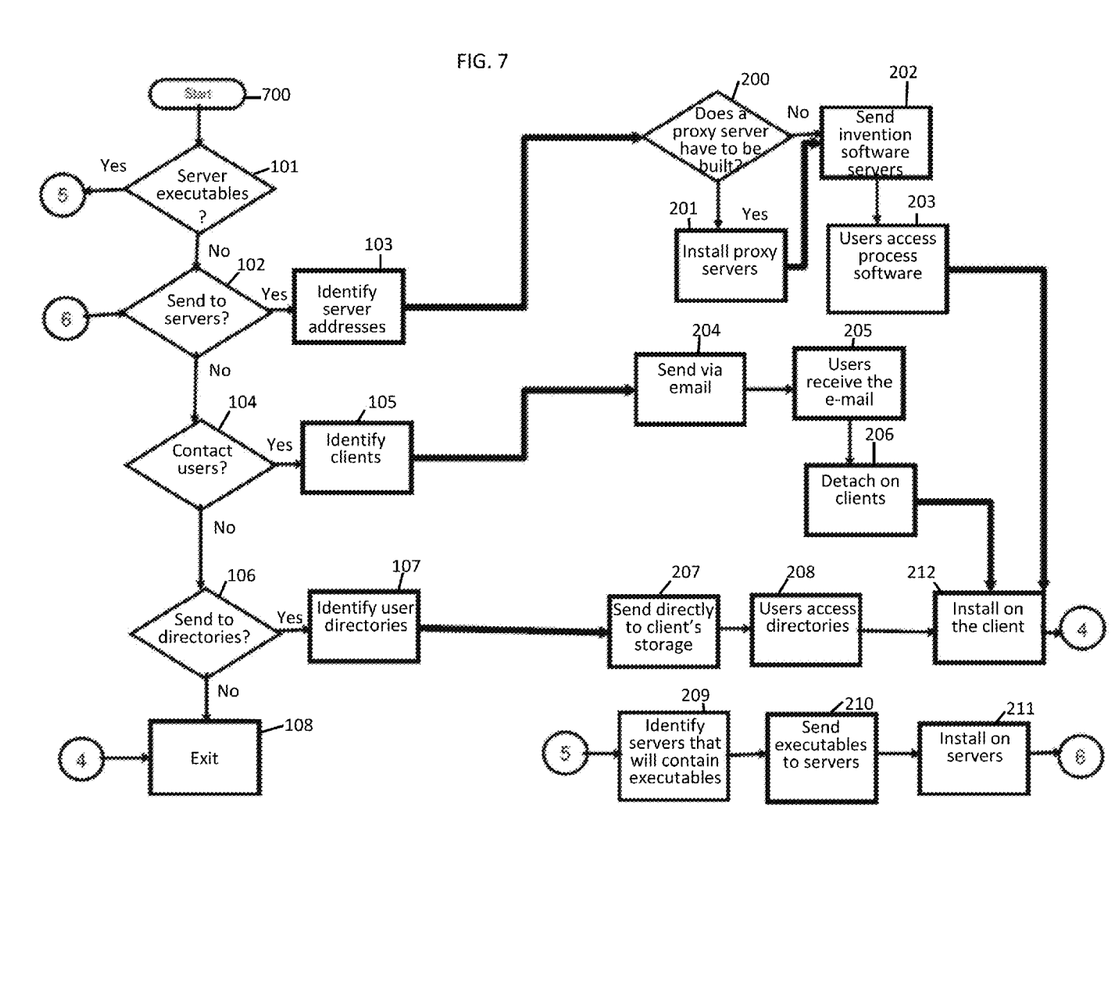
FIG. 7 is a flow diagram illustrating a deployment process for the computer program product of FIG. 4 in accordance with embodiments.

In accordance with embodiments and, with reference to FIG. 7, a deployment process of the computer program product described above is provided. The process begins at block 700 and at block 101 with a determination of whether the program instructions 1002 will reside on a server or servers when executed. If so, then the servers that will contain the executables are identified at block 209. The program instructions 1002 for the server or servers are then transferred directly to the servers' storage via FTP or some other protocol or by copying though the use of a shared file system at block 210 such that the program instructions 1002 are installed on the servers at block 211.

Next, a determination is made on whether the program instructions 1002 are to be deployed by having users access the program instructions 1002 on a server or servers at block 102. If so, the server addresses that will store the program instructions 1002 are identified at block 103 and a determination is made if a proxy server is to be built at block 200 to store the program instructions 1002. A proxy server is a server that sits between a client application, such as a Web browser, and a real server and operates by intercepting all requests to the real server to see if it can fulfill the requests itself. If not, the proxy server forwards the request to the real server. The two primary benefits of a proxy server are to improve performance and to filter requests.

If a proxy server is required, then the proxy server is installed at block 201 and the program instructions 1002 are sent to the (one or more) servers via a protocol, such as FTP, or by being copied directly from the source files to the server files via file sharing at block 202. Another embodiment involves sending a transaction to the (one or more) servers that contained the process software, and have the server process the transaction and then receive and copy the process software to the server's file system. Once the process software is stored at the servers, the users may then access the program instructions 1002 on the servers and copy to the same to their respective client computer file systems at block 203. Alternatively, the servers may automatically copy the program instructions 1002 to each client and then run an installation program for the program instructions 1002 at each client computer whereby the user executes the program that installs the program instructions 1002 on his client computer at block 212 and then exits the process at block 108.

At block 104, a determination is made as to whether the program instructions 1002 are to be deployed by sending the program instructions 1002 to users via e-mail. If a result of the determination is affirmative, the set of users where the program instructions 1002 will be deployed are identified together with the addresses of the user client computers at block 105 and the program instructions 1002 are sent via e-mail to each of the users' client computers. The users then receive the e-mail at block 205 and then detach the program instructions 1002 from the e-mail to a directory on their client computers at block 206. The user executes the program that installs the program instructions 1002 on his client computer at block 212 and then exits the process at block 108.

Lastly, a determination is made on whether the program instructions 1002 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the program instructions 1002 at block 208, execute the program that installs the program instructions 1002 at block 212 and then exit the process at block 108.

Figure 8:
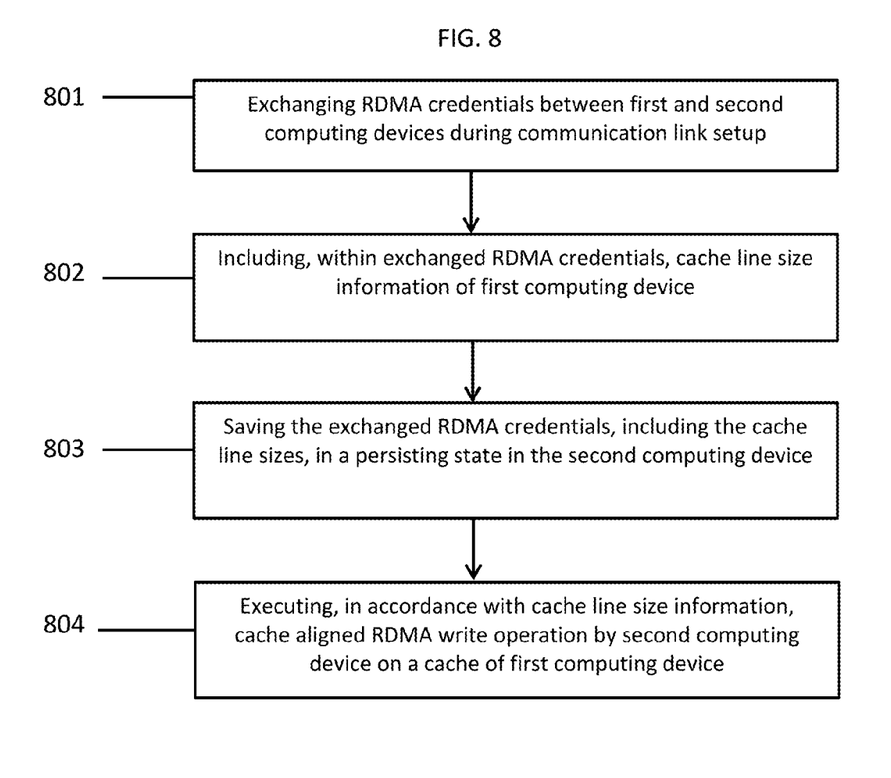
FIG. 8 is a flow diagram illustrating a computer-implemented method for optimizing RDMA operations in accordance with embodiments.

With reference to FIG. 8, a method for optimizing RDMA is provided. The method includes exchanging RDMA credentials 1003 between the first and second computing devices 11 and 12 during a setup of the communication link 1004 between the first and second computing devices 11 and 12 at block 801, including, within the exchanged RDMA credentials 1003, cache line size information of the first computing device 11 at block 802, saving the exchanged RDMA credentials 1003 including the cache line size information, in a persisting state in the second computing device 12 at block 803 and executing, in accordance with the cache line size information, a cache aligned RDMA write operation by the second computing device 12 on a cache 110 of the first computing device 11 at block 804.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing remote direct memory accesses (RDMA), the method comprising:
   exchanging RDMA credentials between first and second computing devices during a setup of a communication link between the first and second computing devices, wherein the exchanging comprises issuing a link request by the second computing device to the first computing device and issuing a link response by the first computing device to the second computing device in response to the link request,
   the link response comprising one of a first indication that an align RDMA write option (ARW) is unsupported by the first computing device and a second indication that the ARW is supported by the first computing device for a predefined cache size;

including, within the exchanged RDMA credentials, cache line size information of the first computing device;

saving the exchanged RDMA credentials, including the cache line size information of the first computing device, in a persisting state;

executing, in accordance with the cache line size information, a cache aligned RDMA write operation by the second computing device on a cache of the first computing device, wherein the cache aligned RDMA write operation comprises at least one of an addition of a trailing pad to RDMA write operation data by the second computing device, a definition of an RDMA write operation start address resulting from a rounding up of a target start address by the second computing device, a transmission of a first portion of RDMA write operation data and a second portion of the RDMA write operation data with metadata in a single RDMA write operation by the second computing device and a transmission of a first portion of RDMA write operation data in a first RDMA write operation by the second computing device and a transmission of a second portion of the RDMA write operation data with existing metadata in a second RDMA write operation by the second computing device; and generating a data availability notification by the second computing device for the first computing device upon completion of the cache aligned RDMA write operation.

* * * * *